United States Patent [19]

Isaki et al.

[11] Patent Number: 4,794,476
[45] Date of Patent: Dec. 27, 1988

[54] CASSETTE EJECT MECHANISM FOR CASSETTE DECK

[75] Inventors: Mikio Isaki; Masanori Shibata; Norikazu Harada, all of Yamagata, Japan

[73] Assignee: Pioneer Electronic Corporation, Tokyo, Japan

[21] Appl. No.: 658,240

[22] Filed: Oct. 5, 1984

[30] Foreign Application Priority Data

Oct. 7, 1983 [JP] Japan .................................. 58-187839

[51] Int. Cl.$^4$ ...................... G11B 5/008; G11B 15/00
[52] U.S. Cl. ..................................... 360/93; 360/74.2
[58] Field of Search ............................ 360/74.1–74.3, 360/90, 93, 96.1, 96.5, 105, 137; 242/197–201

[56] References Cited

U.S. PATENT DOCUMENTS

| 4,018,404 | 4/1977 | Sani ................................. 360/74.2 X |
| 4,224,647 | 9/1980 | Umezawa et al. ............. 360/74.1 X |
| 4,500,049 | 2/1985 | Sugihara ......................... 360/74.2 X |

Primary Examiner—John H. Wolff
Assistant Examiner—David J. Severin
Attorney, Agent, or Firm—Sughrue, Mion, Zinn, Macpeak & Seas

[57] ABSTRACT

A starting mechanism for an ejection mechanism of a cassette tape deck, particularly, a compact cassette deck which may be used for automotive applications and which is automatically operated in response to stopping of rotation of a reel unit of the cassette deck. A power lever is mounted to be reciprocal in a predetermined direction by a reel unit drive motor of the deck when the reel unit stops rotating. A selection lever, having an operator-actuable end, is juxtaposed with the power lever and movable reciprocally in the same predetermined direction to engage the power lever to move therewith when a head base of the deck is in an advanced position. Thereby, the selection lever is reciprocal between positions of engagement and disengagement with and from the power lever with one end thereof as the center.

2 Claims, 10 Drawing Sheets

CASSETTE EJECT MECHANISM FOR CASSETTE DECK

BACKGROUND OF THE INVENTION

The present invention relates to a cassette deck, and more particularly to a cassette eject mechanism for a cassette deck.

Recently developed cassette decks are generally compact. Specifically, a cassette deck of the type installed in an automobile or the like must be compact and thin due to space limitations.

It is, therefore, an object of the invention to provide a cassette loading mechanism in a simplified form which contributes to the compactness and thinness of the cassette deck.

SUMMARY OF THE INVENTION

The invention provides a starting mechanism for an eject mechanism of a cassette deck in which, when the head base is in its advanced position toward a power lever reciprocable in a predetermined direction upon the stopping of the rotation of the reel unit, a selection lever, having an operator-actuable end and being juxtaposed to engage and bodily move with the power lever, is reciprocable between positions of engagement and disengagement with the power lever with its one end as the forming a pivot axis for the selection lever. For this reason, the mechanism requires only a small number of parts, and not only is positive engagement and disengagement of the selection lever with the power lever ensured but also the mechanism is simplified.

Further, a starting mechanism for an eject mechanism according to the invention is arranged so that the sensing arm is rotatably mounted on the power lever which is reciprocally mounted to effect the start of the eject mechanism in an advanced position thereof. The sensing arm engages the rotary cam mechanism which is powered by the reel unit drive motor to advance the power lever when the reel unit stops rotating. A reset arm is provided which is engageable with the cassette in the play position, the sensing arm being forcibly released from engagement with the rotary cam mechanism by swinging the sensing arm by means of the reset arm when the cassette is ejected. For this reason, there is no interference with a subsequent cassette loading action since the power source is off immediately after completion of the ejecting operation, and the mechanism may be returned to its original condition by action of the reset arm even if the motor is stopped before releasing engagement of the rotary cam mechanism and the sensing arm.

BRIEF DESCRIPTION OF THE DRAWINGS

FIG. 1 is a structural view of the FF/REW power transmission mechanism;

DESCRIPTION OF THE PREFERRED EMBODIMENTS

A preferred embodiment of the present invention will now be described with reference to the accompanying drawings.

Figure 1:
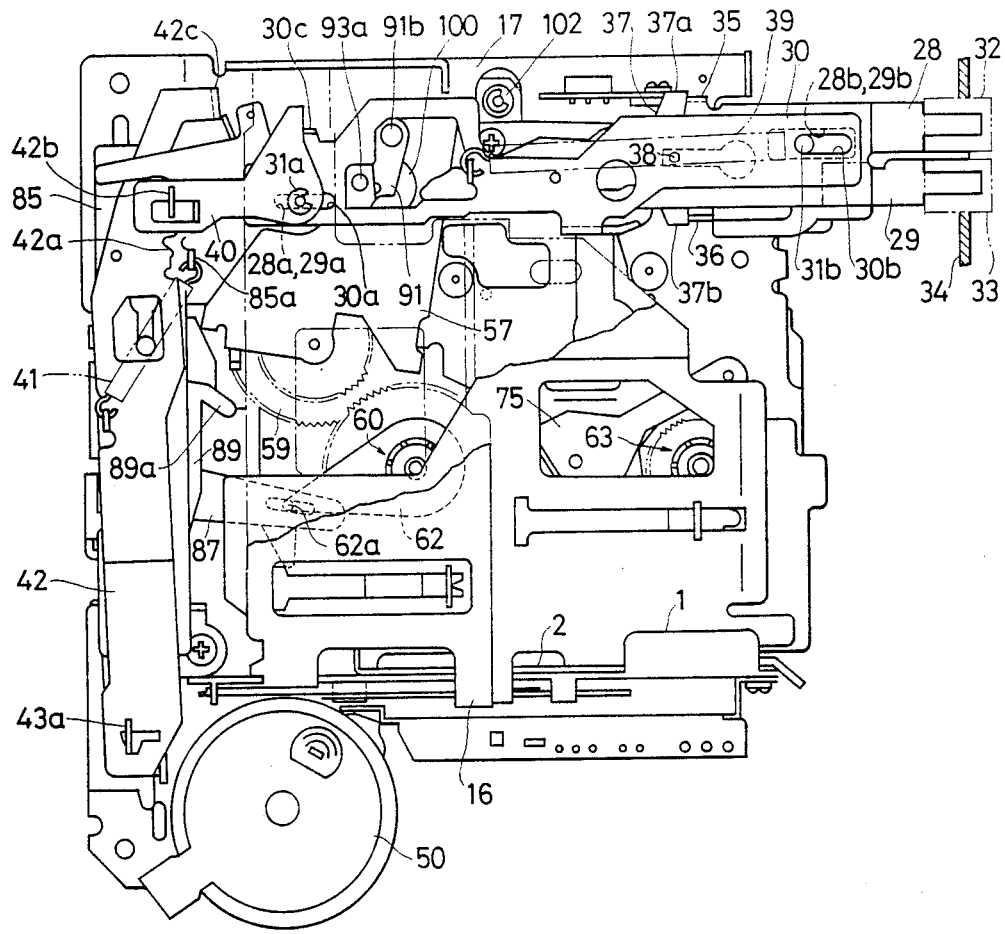
FIG. 1 is a schematic plan view showing a cassette deck according to the invention.
Figure 2:
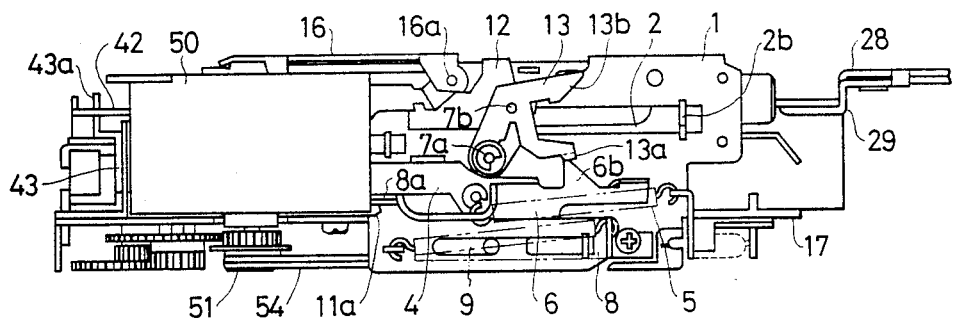
FIG. 2 is a schematic side view of the same.
Figure 3:
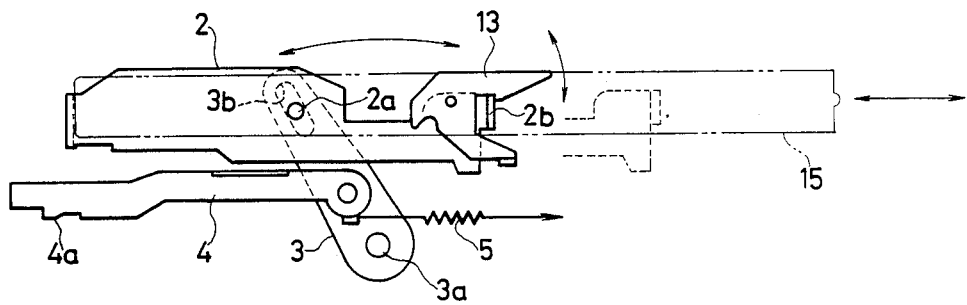
FIGS. 3, 4 and 5 are diagrams explanatory of the manner in which cassette loading is performed.

FIGS. 1 and 2 are schematic plan and side views showing a cassette deck constructed according to the invention, wherein a cassette push lever 2 is slidably engaged with a side frame 1 so as to be slidable back-and-forth in the horizontal direction of the lever 2. A first arm 3 is swingably pivoted around a shaft 3a (FIG. 3). A slot 3b formed in a forward end of the arm 3 slidably engages a pin 2a fixed to the cassette push lever 2. The arm 3 is rotated counterclockwise, as viewed in FIG. 3, by movement of the cassette push lever 2 leftwardly when a cassette 15 is loaded in the deck. The front end of the cassette push lever 2, which is bent in a substantially L shape, engages with the rear end of the cassette 15. A first lever 4 is pivotally mounted to the first arm and is moved by movement of the first arm 3, leftwardly in the drawing, in the inserting direction of the cassette 15. During this movement, the first lever 4 is biased by a spring 5 with respect to the side frame 1, rightwardly in FIG. 3.

Figure 4:
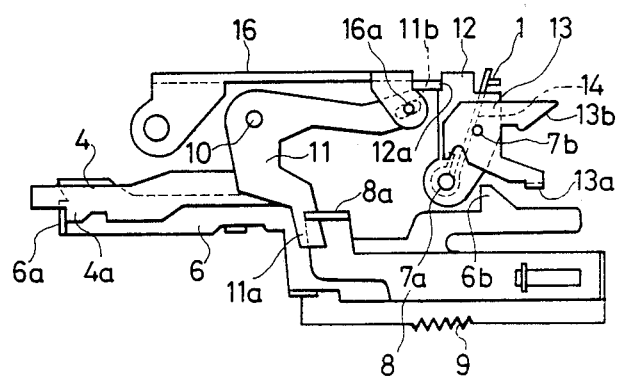

A second lever 6 is slidably engaged with the side frame 1. As shown in FIG. 4, a projection 6a formed at the front end of the second lever 6 is engaged by a pawl 4a of the first lever 4 when the first lever 4 is moved leftwardly so that, following this engagement, the second lever 6 is moved with the first lever 4 in the direction, leftwardly in the drawing, in which the cassette is inserted. A third-lever 8 is slidably mounted on the second lever 6 and is biased by a spring 9 with respect to the second lever 6 in the direction in which the cassette is inserted. As is apparent from FIG. 4, a front end 8a of the third lever 8 engages with one end 11a of a swing arm 11, the latter being rotatably mounted on a shaft 10 fixed to the side frame 1. Thus, the swing arm 11 is biased clockwise by the force of the spring 9.

A control arm 12, rotatably mounted on a shaft 7a fixed to the side frame 1, carries a lock arm 13 pivotally mounted by a shaft 7b to the control arm 12. As shown in FIG. 4, the coil of a spring 14 is disposed around the shaft 7a, and one end of the spring 14 engages the side frame 1 while the other end engages the lock arm 13, thereby biasing the control arm 12 in the counterclockwise direction and the lock arm in the clockwise direction. The lock arm 13 has a lower end 13a which engages the projection 6b of the second lever 6. The projection 6b of the second lever 6 cooperates with the cassette push lever 2 and is moved leftwardly in the drawing when the cassette 15 is loaded. This rotates the lock arm counterclockwise under the force of the spring 14. When the cassette 15 is fully inserted, a front bent portion 2b of the cassette push lever 2 is locked by a hook portion 13b of the lock arm, as shown in FIG. 3.

Figure 5:
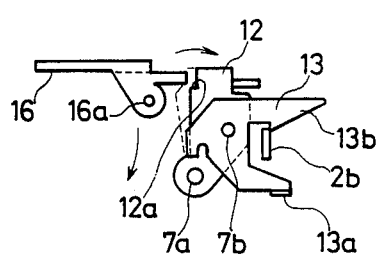

A cassette holder 16, rotatably mounted on the side frame 1, has an intermediate portion engageable with a front slot 11b in the swing arm 11 through a pin 16a. The cassette holder 16 is thereby biased clockwise in FIG. 4 by the spring 9 via the swing arm 11 and the third lever 8. The cassette holder is, however, prevented from being swingably moved by engagement with a stepped portion 12a of the control arm 12, as is clear from FIG. 4. When the cassette 15 is fully inserted and the bent portion 2b of the cassette push lever 2 is locked by the lock arm 13, FIG. 3, the control arm 12 is slightly swung in the clockwise direction under the forces of the springs 5 and 9 acting on the cassette push lever 2 via the lock arm 13. This removes control over the swinging movement of the cassette holder 16 as shown in FIG. 5. Thus, the cassette holder 16 is clockwise swung by the spring force of spring 9 acting on the swing arm 11 to move the inserted cassette 15 downwardly to a play position.

Figure 22A:
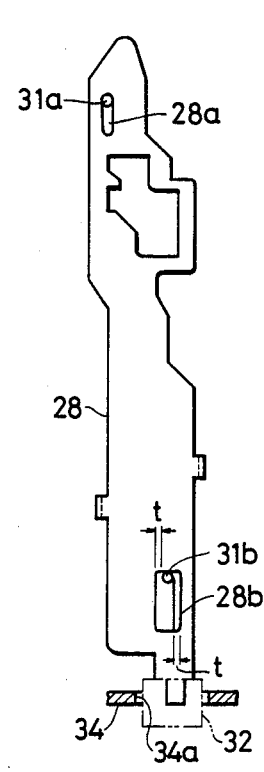
FIGS. 22A and 22B are plan and side views showing locations of the FF lever in the grill opening.
Figure 22B:
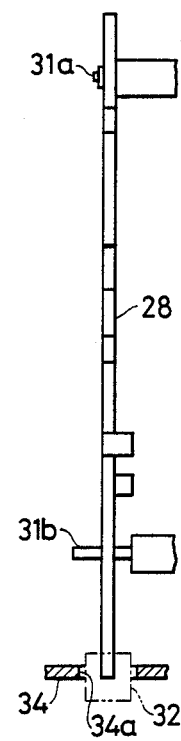

Referring back to FIG. 1, an FF lever 28 is moved leftwardly in the drawing to command the tape to be fast forwarded, and reference numeral 29 is an REW lever which is moved leftwardly in the drawing to command the tape to be rewound. The two levers 28 and 29 are formed of longitudinally extending generally planar members with the lever 28 being arranged above the lever 29 as shown in FIG. 1, and the levers 28 and 29 extending essentially from the front to the rear of the deck. A cam lever 30 of longitudinal planar form extends parallel and adjacent to the levers 28 and 29. The three levers 28, 29 and 30 are provided at their opposite ends with respective slots 28a, 29a, 30a and 28b, 29b, 30b which are slidably engaged with shafts 31a and 31b, respectively, secured to a chassis 17. The slot 30b in the cam lever 30 has a width substantially the same as the diameter of the shaft 31b, whereas the slots 28b and 29b in the levers 28 and 29 have widths somewhat larger than the diameter of the shaft 31b so as to provide predetermined clearances between the shaft 31b and the peripheral wall, as shown in FIG. 22A. This arrangement permits the levers 28 and 29 to swing around the shaft 31a engaged with the slots 28a and 29a in the lateral directions of the slots 28b and 29b as well as in the axial direction of the shaft 31b. As a result, pushbutton knobs 32 and 33 may be correctly positioned in openings 34a in a grille 34 even if the apparatus body is somewhat out of position relative to the grille 34 when the knobs 32 and 33 are mounted in the openings 34a of the grille 34. Although FIGS. 22A and 22B show only the FF lever 28, the REW lever 29 is arranged in the same manner.

Figure 20:
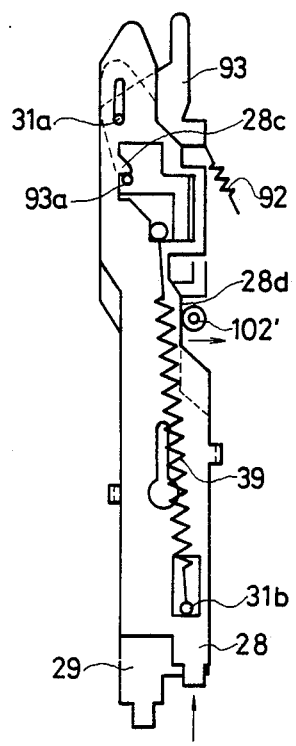
FIGS. 20 and 21 are views explanatory of FF and REW operations.

Bent portions 35 and 36 formed in the FF lever 28 and REW lever 29, respectively, abut against respective projections 37a and 37b formed on opposite sides of a second arm 37. The second arm 37 is fixed to a pin 38 secured to the cam lever 30. A spring 39 is connected between the cam lever 30 and the shaft 31b (FIG. 20).

The FF and REW levers 28 and 29 serve as operative levers for FF and REW commands when these levers are individually depressed, but function as an operative lever for commanding a cassette ejection operation when they are simultaneously depressed. More specifically, the momentum of the pin 38 when both of the levers 28 and 29 are simultaneously depressed is greater than in the case where they are separately depressed. An eject operation is instructed and effected on the basis of the difference in such momentum. In this connection, it is noted that the FF lever 28 and the REW lever 29 are locked by a lock mechanism (as described in more detail below) when they are depressed individually, but are held unlocked when they are depressed simultaneously.

In more detail, the momentum of the pin 38 is transferred to the cam lever 30. A pawl 30c of the cam lever 30 abuts against one end of a rotatable third arm 40 to counterclockwise rotate the latter when the cam lever 30 is moved leftwardly in FIG. 1 to a predetermined extent in response to an eject action instructed by the simultaneous depression of the FF and REW levers 28 and 29. At that time, the other end of the third arm 40 depresses one end 43a of a swingable lock release lever 43 via a selection lever 42 biased upwardly in the drawing by a spring 41, thereby rotating the lock release lever 43.

Figure 6:
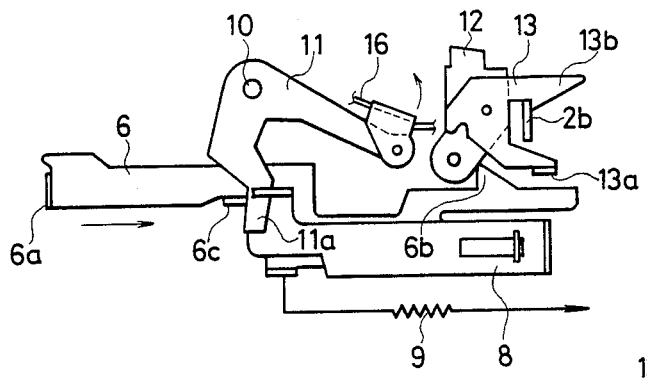
FIGS. 6, 7 and 9 are views explanatory of the manner in which a cassette ejecting operation is performed.
Figure 8:
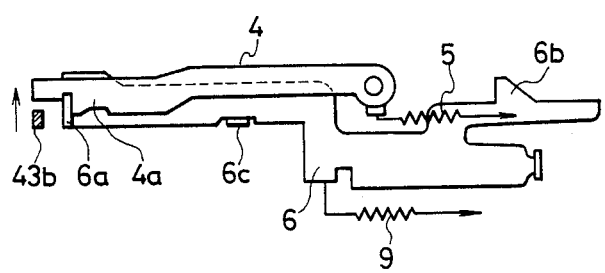

Rotation of the lock release lever 43 moves its other end 43b upwardly in FIG. 8 to raise the front end of the first lever 4 which has been brought by cassette loading to a position where the front end engages with the other end 43b of the lock release lever 43, thereby disengaging the pawl 4a of the first lever 4 from the projection 6a of the second lever 6. This results in moving the second lever 6 rightwardly, causing the projection 6c engaged with the one end 11a of the swing arm 11 to counterclockwise rotate the latter. Accordingly, the cassette holder 16 raises the cassette 15, FIG. 6.

Figure 7:
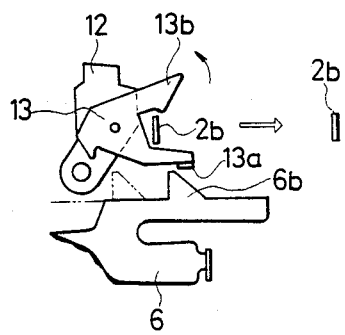

When the cassette 15 is moved upwardly, the lock arm 13 is rotated clockwise by the projection 6b of the second lever 6, FIG. 7 which then moves rightwardly, depressing the lower end 13a of the lock arm, whereupon the bent portion 2b of the cassette push lever 2 is unlocked at the time when the cassette 15 completes its upward movement. Then, the cassette push lever 2 is moved rightwardly to eject the cassette 15. The force required for raising and ejecting the cassette 15 is provided by the springs 5 and 9, which were energized when the cassette was loaded.

Figure 10:
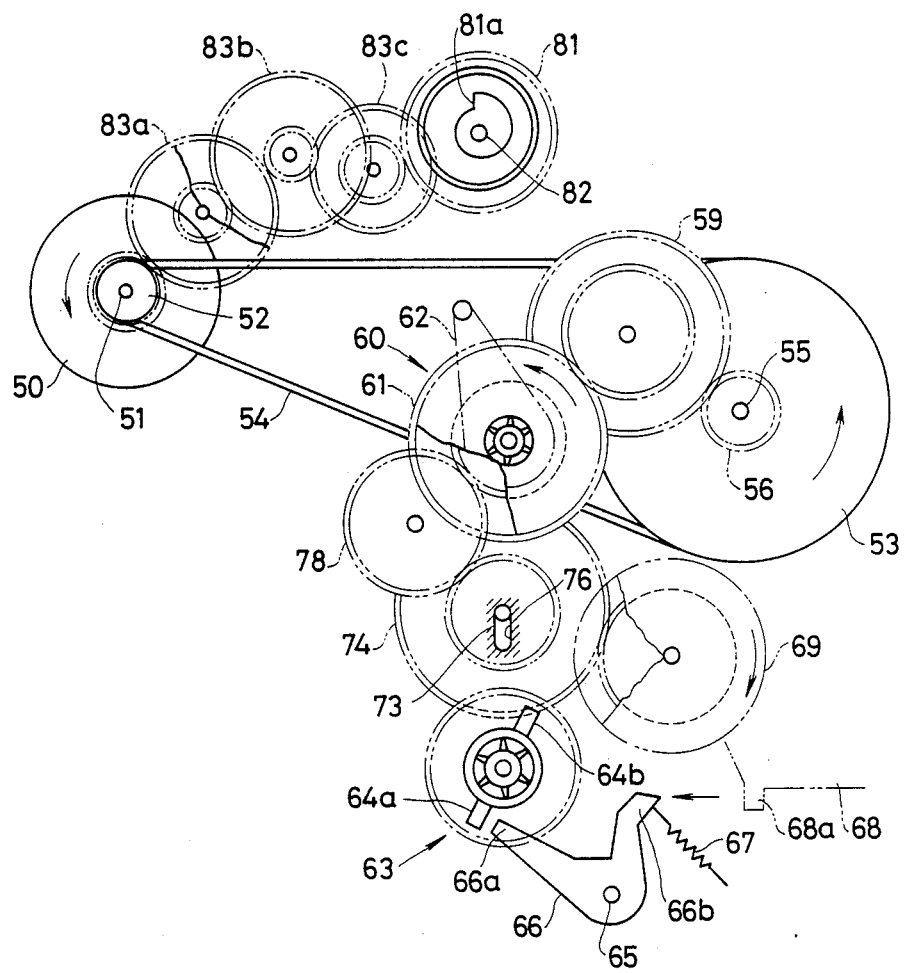
FIG. 10 is a schematic plan view of the reel unit drive mechanism of FIG. 1.
Figure 12:
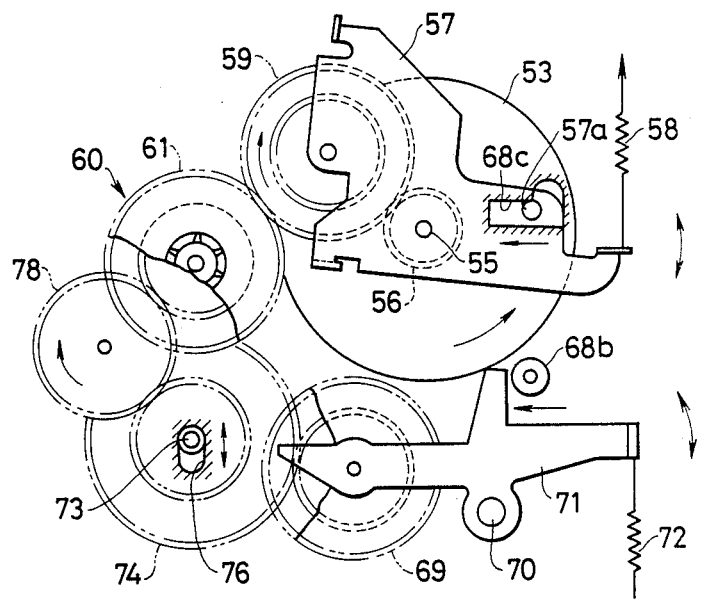
FIG. 12 is a structural view of the constant speed/high-speed power transmission mechanism.

FIG. 10 shows a reel unit drive mechanism for the cassette deck according to the invention. This mechanism includes a belt 54 extended between a pulley 52 coupled to a rotary shaft 51 of a motor 50 and a flywheel 53. The center shaft of the flywheel 53 includes an integral capstan 55. A gear 56 is formed coaxially and integrally with the flywheel 53. With reference to FIG. 12, an idler gear 59 is rotatably mounted on an idler arm 57, which is swingable around the capstan 55 with respect to the chassis 17 and which is counterclockwise biased by a spring 58. The idler gear 59 meshes with the gear 56 and also with a reel drive gear 61 of a reel unit 60 on the take-up side when the cassette is played. The reel unit 60 is provided with a reel drive gear 61 and a sensing release arm 62, the movement of which is restrained by a friction member.

A reel unit 63 on the supply side carries two, for example, retainer pawls 64a and 64b. A ratchet arm 66, which is pivotably mounted on a pin 65 fixed to the chassis 17, is biased by a spring 67 clockwise in FIG. 10. One end 66a of the ratchet arm 66 is engageable with the retainer pawls 64a and 64b, thus forming a ratchet mechanism. The other end 66b of the ratchet arm 66 is depressed by a projection 68a of a head base 68 upon movement of the latter to an advanced position when shifted to a play condition. That action causes the ratchet arm 66 to be rotated counterclockwise to release the ratchet mechanism.

A limit gear 69, as seen in FIG. 12, is rotatably mounted on a limit arm 71 which is swingably pivoted by a shaft 70 to the chassis 17. The limit gear 69 is normally held in mesh with the gear 56 of the flywheel 53 by a spring 72 which urges the limit arm 71 clockwise in FIG. 12 when the head base 68 is in a retracted position. In this state, a pin 57a of the idler arm 57 is engaged with a stepped portion 68c of a generally L-shaped hole in the head base 68 to position the idler arm 57 so that the idler gear 59 does not mesh with the reel drive gear 61. To effect a play operation, the head base 68 is then moved to its advanced position and shifted to a play position, causing a bushing 68b of the head base 68 to swing the limit arm 71 clockwise of the drawing, and thereby releasing the engagement of the gear 56 of the flywheel 53 with the limit gear 69. Also, the stepped portion 68c of the L-shaped hole in the head base 68 is disengaged from the pin 57a of the idler arm 57 to thus allow the idler gear 59 to mesh with the reel drive gear 61, thereby driving the reel unit 60 at a constant speed.

Figure 11:
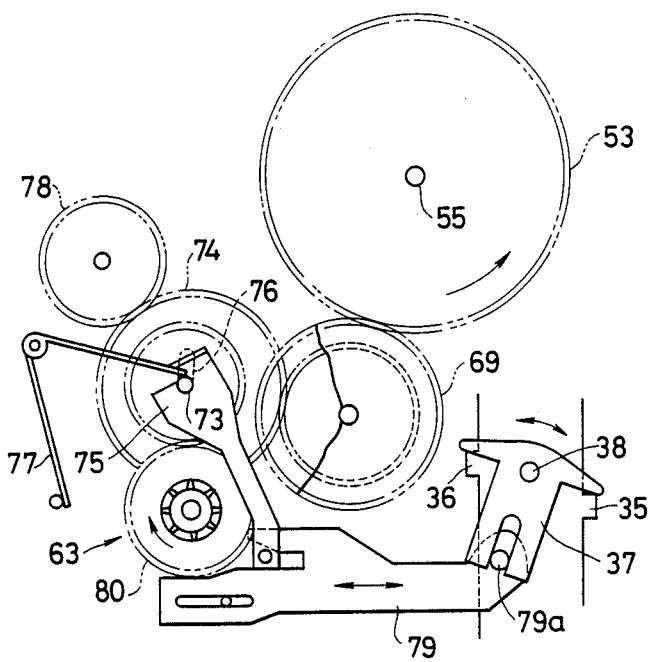

An idler gear 74, which is rotatably mounted on a shaft 73, meshes with the limit gear 69. The shaft 73 of an idler gear 74, as seen in FIG. 11, is rigidly mounted on an idler lever 75 and is linearly movable along a slot 76 formed in the chassis 17. Since the idler lever 75 is urged by a spring 77 upwardly in this drawing, the idler gear normally drives the reel drive gear 61 on the take-up side through the gear 78. On the other hand, for the rewind mode, a changeover lever 79 moves the idler lever 75 downwardly against a spring 77 so that the idler gear 74 meshes with a reel drive gear 80 on the supply side to drive the latter.

Figure 13:
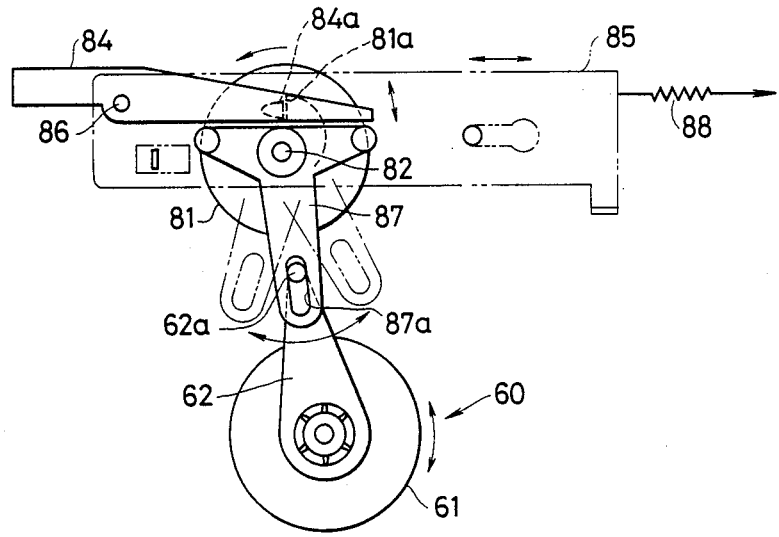
FIG. 13 is a structural view showing one form of the sensing mechanism.

Again referring to FIG. 10, a cam gear 81 is rotatably mounted on a shaft 82 fixed to the chassis 17. Torque required for driving the motor 50 is imparted through three gears 83a, 83b, and 83c to the cam gear 81. A sensing arm 84 having a pawl 84a engageable with a cam 81a of the cam gear 81 is rotatably mounted by a shaft 86 to a sensing power lever 85, as shown in FIG. 13. A T-shaped arm 87, rotatably mounted coaxially with respect to the cam gear 81, has lower slot 87a engageable with a pin 62a of the sensing release arm 62. The sensing release arm 62 is swung rightwardly or leftwardly in FIG. 13 according to the direction in which the reel unit 60 is rotated. In either direction, the sensing arm 84 is rotated counterclockwise in FIG. 13, thereby retracting a pawl 84a thereof from a position where the latter is engaged with the cam 81a of the cam gear 81. Upon the halting of the rotation of the reel unit 60, the pawl 84a of the sensing arm 84 is brought by rotation of the cam gear 81 to a position where the pawl 84a is again engageable with the cam 81a since the sensing release arm 62 is prevented from moving. The sensing arm 84 is therefore moved by the torque which drives the cam gear 81 to the right in FIG. 13.

Since the sensing arm 84 and the sensing power lever 85 are coupled by a shaft 86, the sensing power lever 85 is moved with the sensing arm 84 integrally therewith against the force of a spring 88. When the pawl 84a of the sensing arm 84 is disengaged, the lever 85 is moved back to its original position by the restoring force of the spring 88.

Figure 14:
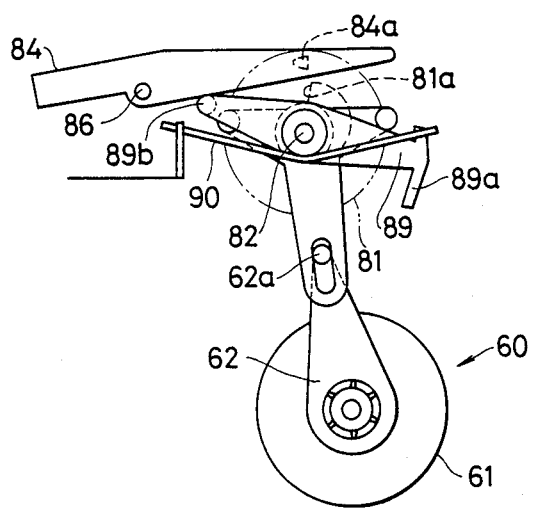
FIG. 14 is a view explanatory of a reset action of the sensing mechanism.

As seen in FIG. 14, a reset arm 89 is rotatably mounted coaxially with the T-shaped arm 87 and is biased by a spring 90 clockwise in the drawing. An inclined portion 89a formed at one end of the reset arm 89 is normally projected to the loading side of the cassette as shown in FIG. 1. The reset arm is swung by the cassette counterclockwise in the drawing when the cassette is lowered, and is swung by the bias force of the spring 90 clockwise in FIG. 14 when the cassette is ejected. The other end 89b of the reset arm is adapted to swing the sensing arm 84 counterclockwise in the drawing.

With this arrangement, an automatic eject action as described below is completed just before the pawl 84a of the sensing arm 84 is disengaged from the cam 81a of the cam gear 81 so that the pawl 84a of the sensing arm 84 is fully released from engagement with the cam 81a of the cam gear 81 by action of the reset arm 89, even if the motor 50 is stopped, thereby preventing interference with a subsequent cassette loading action.

Figure 15:
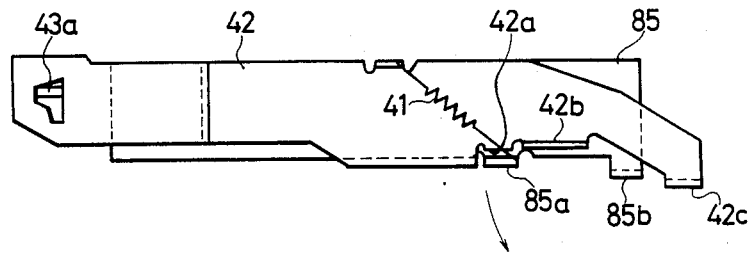
FIGS. 15 and 16 are views explanatory of operations of the selection lever and sensing power lever.

Reference to FIG. 1, the selection lever 42 and the sensing power lever 85, which are juxtaposed with each other, are slidable downwardly in the drawing. The selection lever 42 uses the one end 43a of the lock release lever 43 as a point of action and as a fulcrum and is thus swingable against the force of the spring 41 between a position, FIG. 15, here it is engaged with the sensing power lever 85 and another position where it is out of engagement therewith, FIG. 16. This is done to selectively establish engagement and disengagement of a recess 42a of the selection lever 42 with a bent portion 85a of the sensing lever 85. In the play mode where the head base 58 is in its advanced position, as seen in FIG. 15, the recess 42a of the selection lever 42 is engaged with the bent portion 85a of the sensing power lever 85. When the tape is run to the end and the sensing power lever 85 is moved downwardly in FIG. 1 by a sensing action as described with reference to FIG. 13, the selection lever 42 is moved integrally with the sensing power lever 85. Accordingly, the lock release lever 43 is driven by the selection lever 42 in the same manner as in a manual eject action so that an ejection action is automatically effected when the tape is run to its end.

Figure 17:
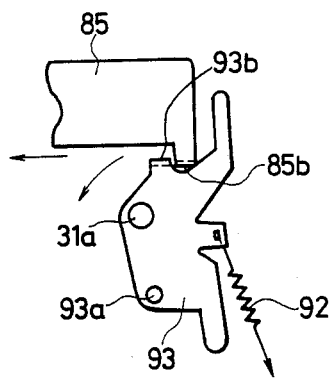
FIG. 17 is a representation explanatory of a lock release action of the lock arm.
Figure 21:
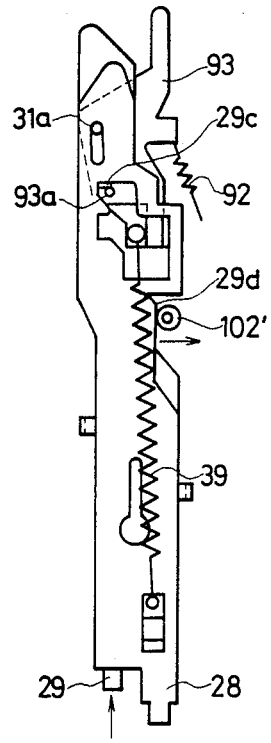

On the other hand, when the tape is fast forwarded or rewound, the front end of the FF or REW lever 28 or 29 is depressed by an upright portion 42b of the selection lever 42 to swing the former. At this time, the selection lever 42 is not moved even if the sensing power lever 85 is moved by a sensing action since the recess 42a of the selection lever 42 is disengaged from the bent portion 85a of the sensing power lever 85. This will not cause an ejection action. It is noted that, as shown in FIG. 17, a lock arm 93, rotatably mounted on the shaft 3, is biased by a spring 92 clockwise in the drawing. The FF lever 28 or the REW lever 29 is locked by a lock pin 93a of the lock arm 93 in a depressed condition as shown in FIG. 20 or FIG. 21. When the sensing power lever 85 is moved, an extended portion 85b of the power lever depresses a portion 93b of the lock arm 93 to swing the lock arm 93 counterclockwise in FIG. 17 so that the FF lever 28 or the REW lever 29 is unlocked.

Figure 16:
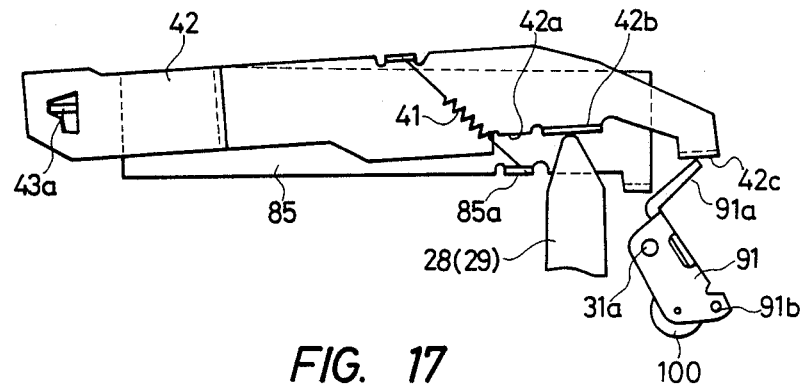
Figure 18:
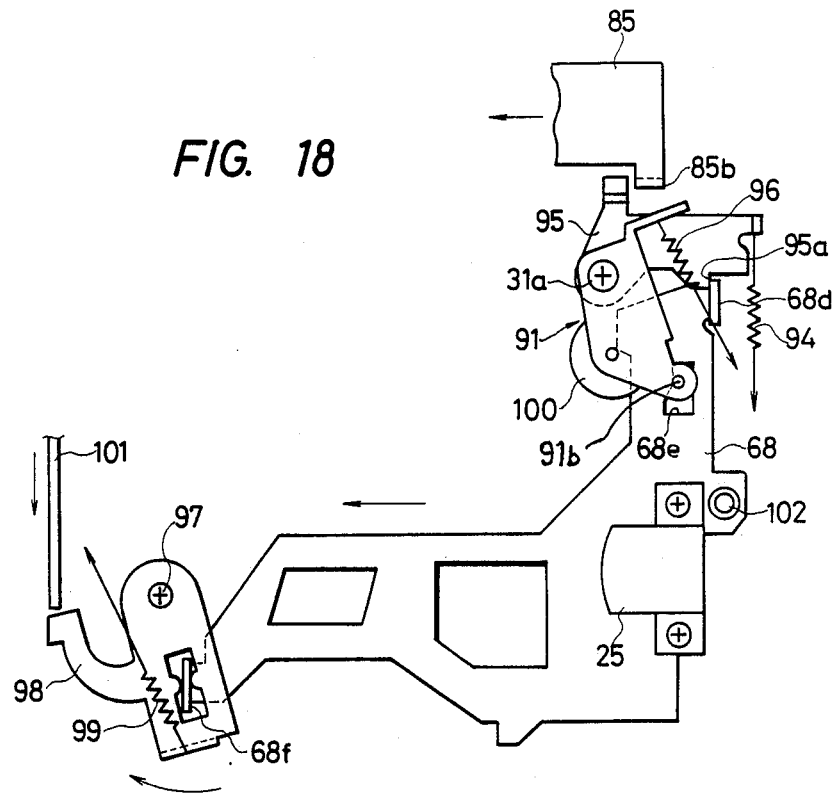
FIG. 18 is a view explanatory of advancement of the head base.
Figure 19:
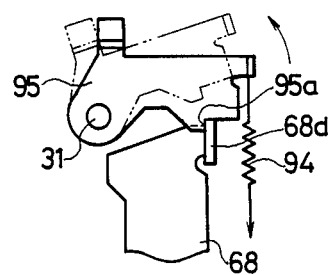
FIG. 19 is a view explanatory of a lock release action of the head base.

When the head base 68 is in its retracted position, a pinch roller unit 91 is rotated around the shaft 31a, counterclockwise in FIG. 16, causing its end 91a to depress a portion 42c of the selection lever 42 to swing the selection lever 42 so that an ejection action is not caused. Under such circumstances, when only the sensing power lever 85 is moved, as shown in FIG. 18, the lock arm 95, which is rotatably mounted on the shaft 41a and biased by a spring 94 clockwise in the drawing and whose stepped portion 95a engages a bent portion 68d of the head base 68 to lock the head base 68 in its retracted position, is swung counterclockwise in FIG. 19 by the portion 85b of the sensing power lever 85. This action unlocks the head base 68.

Figure 9:
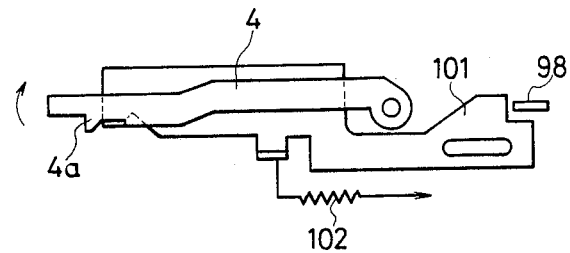

Referring to FIG. 18, the head base 68 is provided with a hole 68c in which is engaged a pin 91b of a pinch roller unit 91. When the pin 91b is unlocked, a head base (68) advancing force is released from a spring 96 coupled between the pinch roller unit 91 and the chassis 17. The front upright portion 68f of the head base 68 is engaged with an arm 98 rotatably mounted on a shaft 97 fixed to the chassis 17. An advancing force is applied thereto by a spring 99 which biases the arm 98 clockwise in the drawing. This moves the head base in the direction of the arrow A. At the same time the head base 58 is advanced, the pinch roller unit 91 is swung clockwise in the drawing to thus advance a pinch roller 100. Upon ejection, the arm 98 is counterclockwise rotated by a lever 101 which is retracted by the force of a spring 102, as shown in FIG. 9, so that the head base 68 is moved back to its initial condition and then locked by a lock arm 95 to its retracted position.

The fast forward (FF) and rewinding (REW) operations will be apparent from the following description.

During the period of time when the cassette is loaded and the tape deck is in the play mode, the FF lever 28 is depressed and operated as shown in FIG. 20 to engage the projection 28c of the FF lever 28 with the lock pin 93a of the lock arm 93, thereby locking the FF lever 28 in an operative position. At the same time, the cam portion 28d is held to the head base 68 to depress a head base pin 102' rightwardly of the drawing, thereby slightly retracting the head base 68. The pinch roller 100 is moved back to release pressure contact with the capstan 55 and to allow minimal contact between the head 25 and the tape.

As shown in FIG. 12, the pin 57a of the idler arm 57 is depressed by the stepped portion 68c of the L-shaped hole in the head base 68 to rotate the idler arm 57 clockwise in the drawing, thereby releasing engagement of the reel drive gear 61 with the idler gear 59. Simultaneously with this release, the head base bushing 68b is disengaged from the limit arm 71 to thus allow the limit arm 1 to be swung by the force of the spring 72 clockwise in the drawing so that the limit gear 69 meshes with the gear of the flywheel 53, thereby transmitting high-speed rotational motion from the flywheel gear 53 to the reel drive gear 61 via the limit gear 69, idler gear 74, and the FF gear 78. In this manner, the tape is fast forwarded.

For stopping the fast-forwarding action, the REW lever 29 is lightly depressed and operated to lower it from the condition of FIG. 20 to a position where the projection 29c of the REW lever 29 slightly pushes the lock pin 93a down, rightwardly in the drawing, so that the projection 28c of the FF lever 28 is disengaged from the lock pin 93a, FIG. 21 to restore the FF lever 28 by bias of the spring 39, thereby moving the cassette deck to its initial play condition.

If a tape end condition is involved in the fastforwarding action, the aforementioned reel unit rotation stoppage sensing mechanism (FIG. 13) is actuated to unlock the FF lever 28 as the sensing power lever 85 is moved, as previously described with reference to FIG. 18, thereby advancing the head base 68 and returning it to its playmode state.

For rewinding, the REW lever 29 is depressed and locked in an operative position by engagement of its projection 29c with the lock pin 93a as shown in FIG. 21. Then, the head base pin 102' is urged in the direction of the arrow by the cam portion 29d as in the fast-forwarding mode. The head base 68 is therefore retracted to release the mesh engagement of the idler gear 59 with the reel drive gear 61. At the same time, the second arm 37, FIG. 11, is swung around the pin 38, clockwise in the drawing, in association with the depression and operation of the REW lever 29. This moves the changeover lever 79, in the direction of the arrow, which is then engaged by the pin 79a with the second arm 37 to move the idler lever 75 downwardly in the drawing so that the idler gear 74 is linearly moved along the slot 76 to mesh with the reel drive gear 80. This imparts high-speed rotational motion from the gear of the flywheel 53 to the drive reel gear 80 via the limit gear 69 and the idler gear 74 for effecting the rewinding operation.

As set forth hereinbefore, the cassette loading mechanism according to the invention is arranged so that not only the control arm for controlling movement of the cassette holder in the direction of the lowered position, but also the lock member (lock arm) engageable with the cassette for locking the movable member (cassette push lever) which has been moved to a predetermined distance in the direction in which the cassette is inserted, serve as swing members. Further, the lock arm is pivotally supported by the lock arm, the control arm, and the lock arm, being biased by single biasing means in the control and locking directions. Since the control and lock arms are a combination of the swing arms, the load loss is minimized, resulting in the bias force of the biasing means, permitting compactness of the cassette deck.

We claim:

1. A starting mechanism for an eject machanism of a tape deck having a head base movable between a retracted position and a advanced position, said eject machanism adapted to be automatically operated in response to stoppage of rotation of a reel unit of a cassette deck, said starting mechanism comprising: a power lever, means for mounting said power lever for reciprocation between an original position and an advanced position, a reel unit drove motor, means operatively coupling said reel unit drive motor to said power lever to reciprocate the power lever by the output torque of said motor when said reel unit stops rotation; and a selection lever having an operator-actuable end and a second end, said selection lever being juxaposed with said power lever and movable reciprocally, said selection lever being pivotably mounted about said second end for pivoting between a first position for engagement with said power lever when said head base is in the advanced position to be moved with said power lever whereby movement of the power lever moves the selection lever to initiate the eject mechanism to eject a cassette from the cassette deck and a second position disengaged from the power lever with the head base in the retracted position wherein movement of the power lever reverses tape direction and moves the head base to the advanced position.

2. A starting mechanism for an eject mechanism adapted to be automatically operated in response to rotation stoppage of a reel unit of a cassette deck, comprising: a rotary cam mechanism powered by a reel unit drive motor; means for energizing said reel unit drive motor to actuate said rotary cam mechanism, a power lever reciprocally mounted for movement between an original position and an advanced position; movement of said power lever to said advanced position initiating operation of the eject mechanism to eject a cassette from said cassette deck; a sensing arm rotatably mounted on said power lever and engageable with said rotary cam mechanism upon stopping of rotation of said reel unit such that said sensing arm is driven by the torque of said drive motor thereby reciprocating said power lever to the advanced position; biasing means for returning said power lever to the retracted position when said rotary cam mechanism is disengaged from said sensing arm; and a reset arm mounted to be engageable with a cassette loaded in a play position, said reset arm being adapted to swing said sensing arm when said cassette is ejected thereby forcibly releasing engagement with said rotary cam mechanism.

* * * * *